(12) United States Patent
Hall et al.

(10) Patent No.: US 11,209,400 B2
(45) Date of Patent: Dec. 28, 2021

(54) ACOUSTIC PROBE FOR INSPECTION OF WOODEN SPECIMEN

(71) Applicant: INNERVIEW TECHNOLOGIES LIMITED, Dublin (IE)

(72) Inventors: Dion Hall, Canberra (AU); Yishi Lee, Littleton, CO (US); Wayne Hall, Denver, CO (US)

(73) Assignee: INNERVIEW TECHNOLOGIES LIMITED, Dublin (IE)

( * ) Notice: Subject to any disclaimer, the term of this patent is extended or adjusted under 35 U.S.C. 154(b) by 163 days.

(21) Appl. No.: 16/518,762

(22) Filed: Jul. 22, 2019

(65) Prior Publication Data

US 2020/0158695 A1 May 21, 2020

Related U.S. Application Data

(60) Provisional application No. 62/768,938, filed on Nov. 18, 2018.

(51) Int. Cl.
*G01N 29/34* (2006.01)
*G01N 29/22* (2006.01)
*G01N 29/24* (2006.01)
*G01N 29/44* (2006.01)

(52) U.S. Cl.
CPC ....... *G01N 29/223* (2013.01); *G01N 29/2468* (2013.01); *G01N 29/2481* (2013.01); *G01N 29/34* (2013.01); *G01N 29/2462* (2013.01); *G01N 29/44* (2013.01); *G01N 2291/0238* (2013.01)

(58) Field of Classification Search
CPC ............. G01N 29/223; G01N 29/2468; G01N 29/2481; G01N 2291/0238; G01N 29/34; G01N 29/2462; G01N 29/44
USPC ......... 73/602, 579, 597, 598, 599, 600, 632, 73/644
See application file for complete search history.

(56) References Cited

U.S. PATENT DOCUMENTS

| | | | | | |
|---|---|---|---|---|---|
| 5,621,172 | A | * | 4/1997 | Wilson | G01M 5/005 |
| | | | | | 73/579 |
| 5,760,308 | A | * | 6/1998 | Beall | G01N 29/07 |
| | | | | | 73/598 |
| 6,347,551 | B1 | * | 2/2002 | Turpening | G01N 29/0609 |
| | | | | | 73/597 |

(Continued)

*Primary Examiner* — Lisa M Caputo
*Assistant Examiner* — Rose M Miller

(57) ABSTRACT

Non-limiting examples of the present disclosure relate to devices, systems and methods for conducting non-destructive evaluation (NDE) of a wooden specimen, where structural integrity of the wooden specimen is assessed without being compromised. A non-limiting example of a wooden specimen is a wooden utility pole. One or more NDE devices, attached to the wooden specimen, are configured to transmit and/or receive ultrasonic signals to execute NDE of the wooden specimen. An exemplary NDE device may be controlled by another computing device via a data transmission connection. Examples described herein pertain to a variety of coverages that comprise but are not limited to: coverage for a single NDE device; coverage for a system of two or more NDE devices that are utilized to conduct NDE of the wooden specimen; and coverage where one or more NDE devices interface with one or more computing devices to conduct NDE of the wooden specimen.

32 Claims, 11 Drawing Sheets

(56) References Cited

U.S. PATENT DOCUMENTS

| | | | |
|---|---|---|---|
| 6,813,948 B1* | 11/2004 | Rinn | G01N 29/045 |
| | | | 73/584 |
| 2005/0160819 A1* | 7/2005 | Wang | G01N 29/2481 |
| | | | 73/632 |
| 2013/0223189 A1* | 8/2013 | Davis, III | G01S 15/10 |
| | | | 367/99 |
| 2014/0069192 A1* | 3/2014 | Bartuli | G01N 29/12 |
| | | | 73/579 |

* cited by examiner

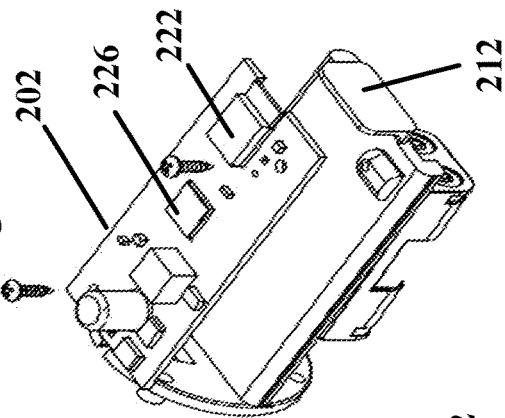
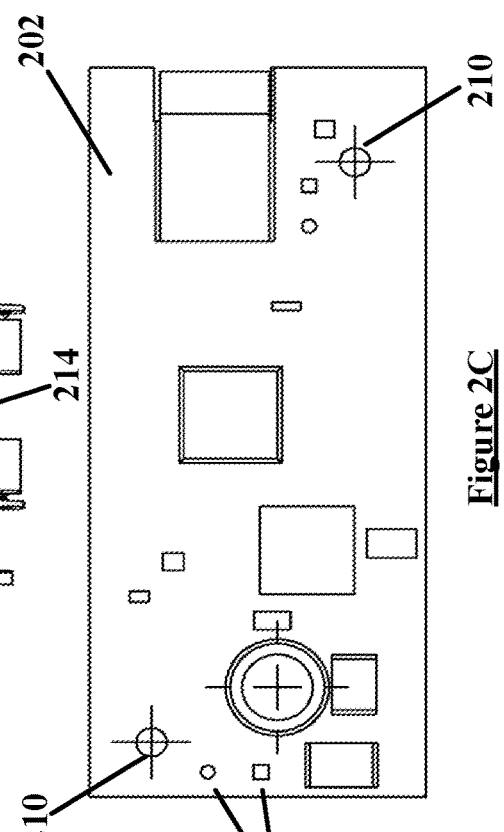
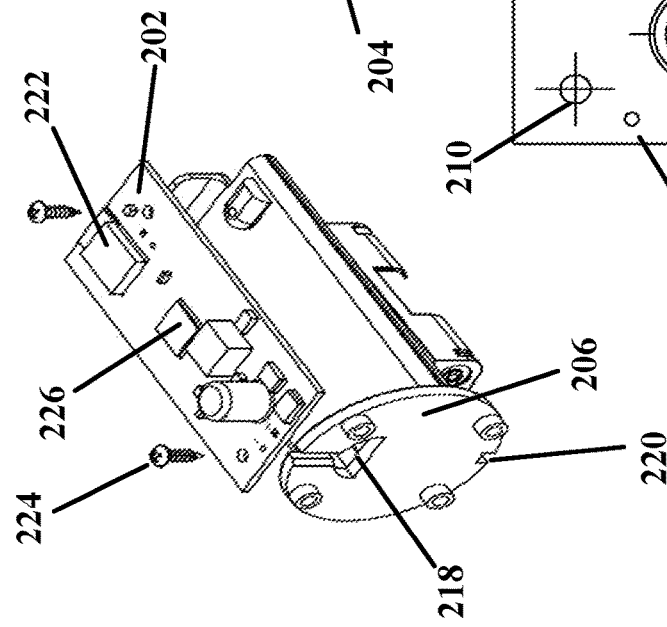
FIG. 2

FIG. 4
400 →
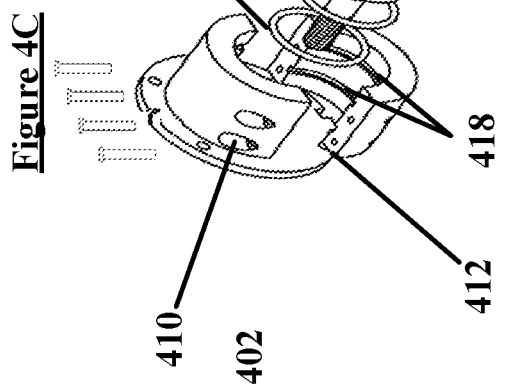
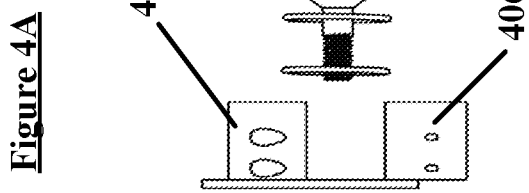
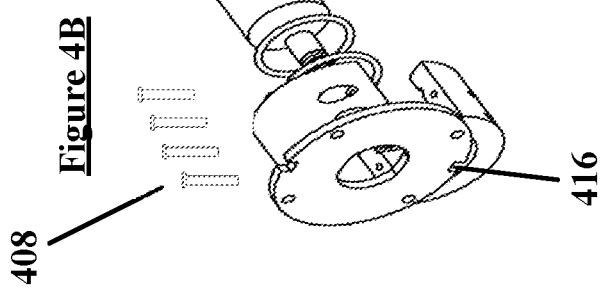

FIGURE 6
600
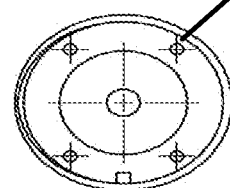
Figure 6C
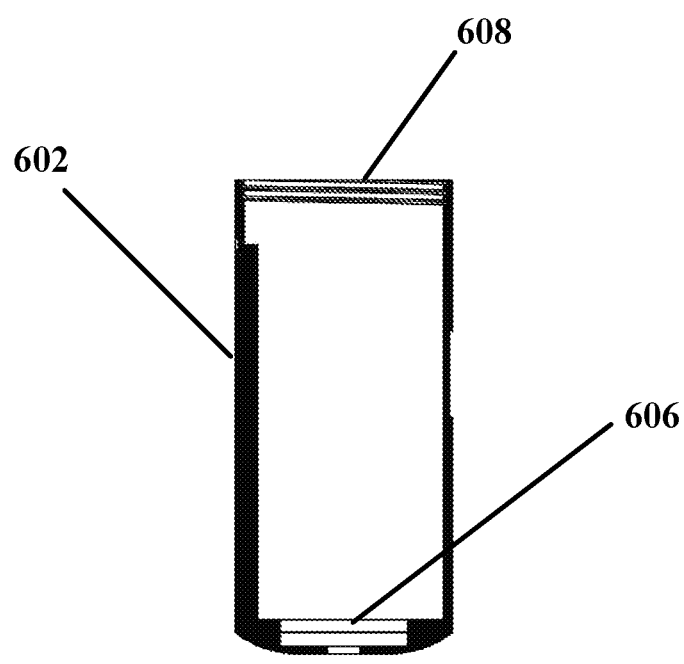
SECTION A-A
Figure 6B
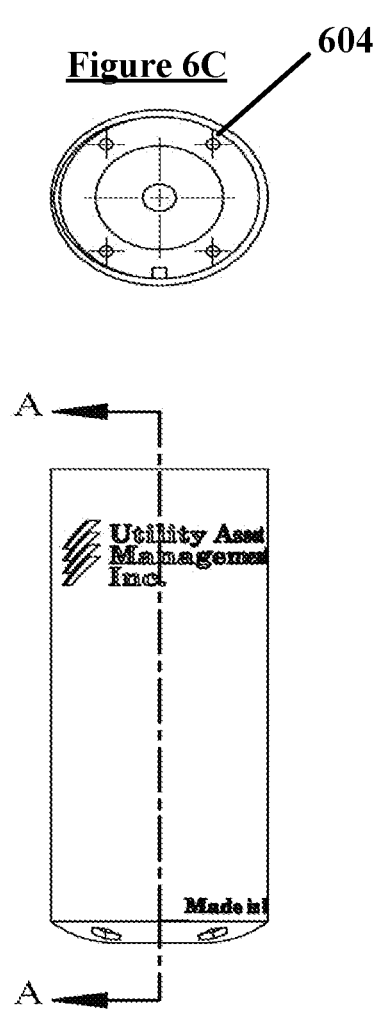
Figure 6A

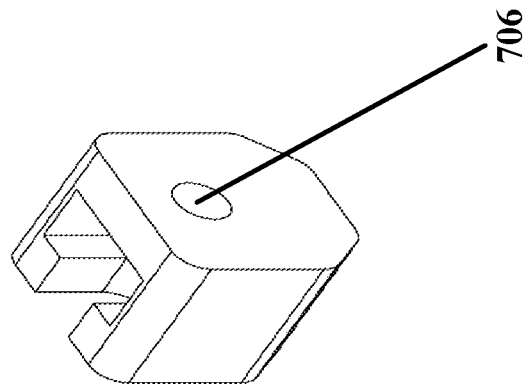
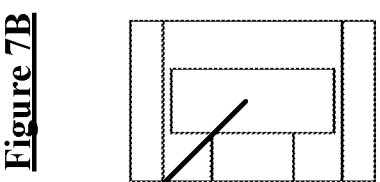
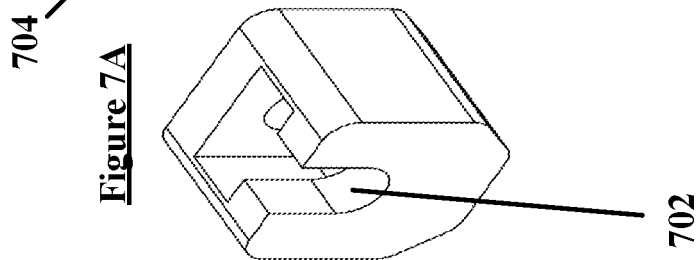
FIG. 7

ACOUSTIC PROBE FOR INSPECTION OF WOODEN SPECIMEN

CROSS-REFERENCE TO RELATED APPLICATIONS

This application claims priority to U.S. Provisional Application No. 62/768,938, filed Nov. 18, 2018 and titled "WIRELESS ULTRASONIC PROBE FOR UTILITY POLE INSPECTIONS", which is hereby incorporated by reference herein in its entirety.

TECHNICAL FIELD

The present disclosure relates to devices, systems and methods capable of producing and receiving acoustic signals in the area of non-destructive evaluation (NDE), where the acoustic signals may be utilized to assess structural integrity of a wood specimen.

BACKGROUND

The aging infrastructure power distribution grids across the world demands a rigorous and an objective monitoring process to assess structural integrity of hundreds of millions of wooden utility poles. Current inspection methodologies are antiquated and either lack the ability to provide truly accurate evaluations and/or result in compromising the structural integrity of a utility pole. For instance, one commonly utilized method of evaluating utility poles is an inspectors' visual evaluation of the pole. Visual inspection may be able to identify some structural integrity issues but is not a true indicator of whether the utility pole is experiencing incipient decay internally. As an example, a utility pole may appear to be fine, where an inspector gives the utility pole a passing grade, but internal decay may significantly affect the longevity of the pole, sometimes cutting its lifetime by decades. As there may be long gaps between the times when a utility pole is inspected, it is paramount to accurately assess the structural integrity of the utility pole.

Alternative measures for inspecting utility poles include drilling into the utility pole and testing a wood sample from its core. While this may provide more a reliable indication of whether a utility pole is experiencing decay, as compared with visual inspection, drilling into the core of a utility pole compromises the structural integrity of the pole. For instance, utility poles are coated with a protective layering that helps minimize exposure to elements that expedite decay. If this protective layering is compromised, decay can be expedited due to exposure to elements of nature, bacteria, etc.

Additional concerns exist when new technology is integrated in a field that commonly uses such antiquated methods to evaluate structural integrity. For instance, usage of complex electronic equipment may pose training challenges for inspectors and result in human error during actual operation as complex operating environments can be created.

For these and other reasons, the present disclosure is presented to greatly advance the technical field of testing of structural integrity of utility poles.

SUMMARY

In view of the foregoing technical challenges, non-limiting examples of the present disclosure relate to devices, systems and methods for conducting non-destructive evaluation (NDE) of a wooden specimen, where structural integrity of the wooden specimen is assessed without being compromised. A non-limiting example of a wooden specimen is a wooden utility pole. However, examples described herein may pertain to NDE of any type of wooden specimen including but not limited to wooden cylinders such as wooden utility poles, pilings and logs, among other examples. One or more NDE devices, attached to the wooden specimen, are configured to transmit and/or receive acoustic signals to execute NDE of the wooden specimen. Non-limiting examples of acoustic signals comprise but are not limited to ultrasonic waves/ultrasonic signal data. Ultrasonic signals are referenced throughout the description for convenience, however it is to be understood that the present disclosure may work with any type of acoustic signal. An exemplary NDE device may be controlled by another computing device via a data transmission connection. Examples described herein pertain to a variety of coverages that comprise but are not limited to: coverage for a single NDE device; coverage for a system of two or more NDE devices that are utilized to conduct NDE of the wooden specimen; and coverage where one or more NDE devices interface with one or more computing devices to conduct NDE of the wooden specimen.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 2 illustrates an exploded view of an NDE device that highlights an electronic processing assembly, with which aspects of the present disclosure may be practiced.

FIG. 4 illustrates an exploded view of an NDE device that highlights a transducer assembly, with which aspects of the present disclosure may be practiced.

FIG. 6 illustrates a side view of an NDE device that provides an exploded view of a case assembly, with which aspects of the present disclosure may be practiced.

FIG. 7 illustrates a side view of an NDE device that provides a 3D view of a coupling interface component, with which aspects of the present disclosure may be practiced.

DETAILED DESCRIPTION

Figure 1:
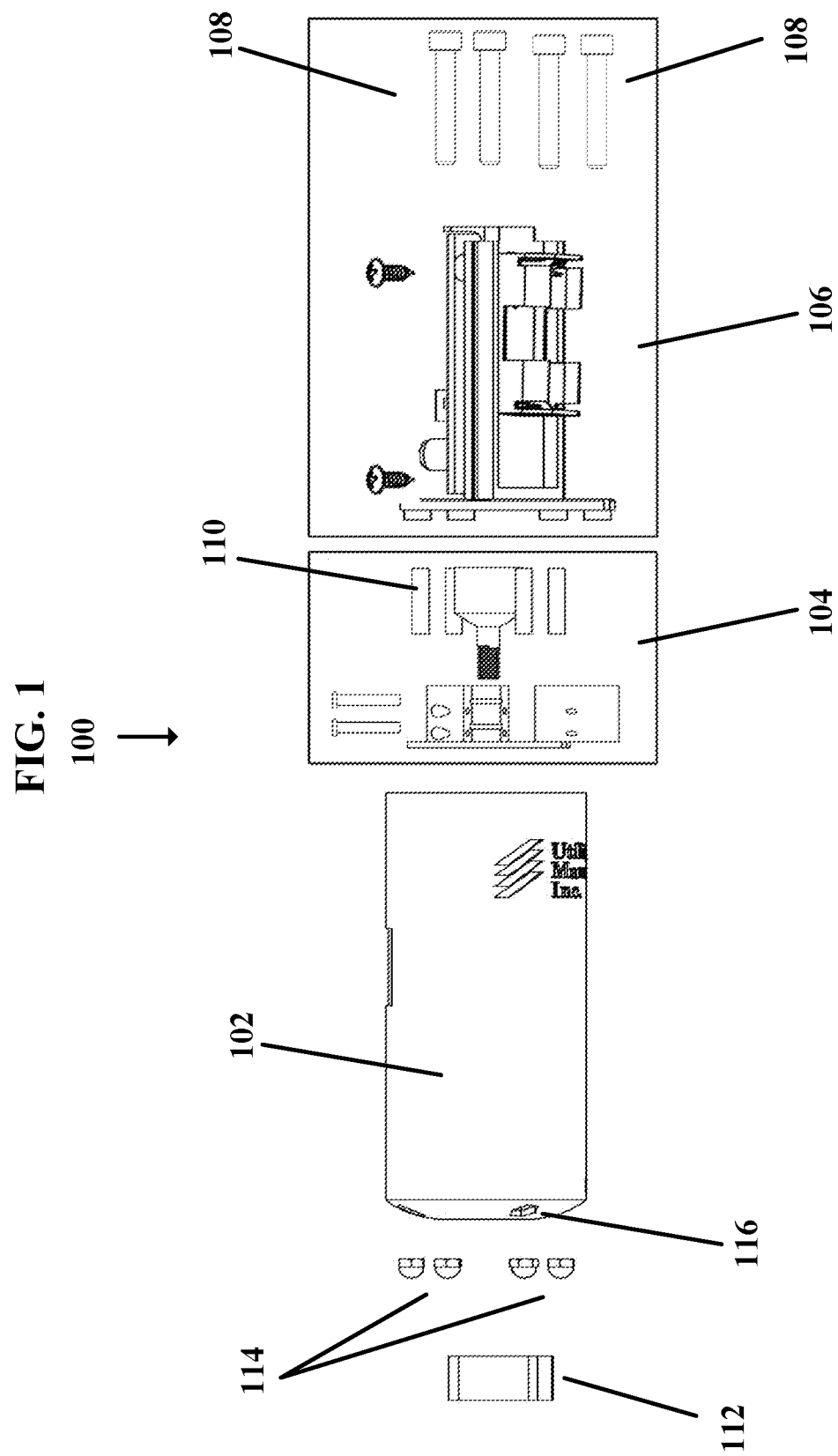
FIG. 1 illustrates an exploded view of a non-destructive evaluation (NDE) device for testing of a wooden specimen, with which aspects of the present disclosure may be practiced.

Non-limiting examples of the present disclosure relate to devices, systems and methods for conducting non-destructive evaluation (NDE) of a wooden specimen, where structural integrity of the wooden specimen is assessed without being compromised. A non-limiting example of a wooden specimen is a wooden utility pole. However, examples described herein may pertain to NDE of any type of wooden specimen including but not limited to wooden cylinders such as wooden utility poles, pilings and logs, among other examples. Moreover, it is to be understood that the present disclosure may be extended to work with structures comprising any material (not just wood) though modifications that are recognized by one skilled in the field of art.

One or more NDE devices, attached to the wooden specimen, are configured to transmit and/or receive acoustic signals to execute NDE of the wooden specimen. Non-limiting examples of acoustic signals comprise but are not limited to ultrasonic waves/ultrasonic signal data. Ultrasonic signals are referenced throughout the description for convenience, however it is to be understood that the present disclosure may work with any type of acoustic signal. An exemplary NDE device may be controlled by another computing device via a data transmission connection. Examples described herein pertain to a variety of coverages that comprise but are not limited to: coverage for a single NDE device; coverage for a system of two or more NDE devices that are utilized to conduct NDE of the wooden specimen; and coverage where one or more NDE devices interface with one or more computing devices to conduct NDE of the wooden specimen.

In one non-limiting example, an NDE device is described. An exemplary NDE device may comprise: a transducer assembly that comprises an ultrasonic transducer; an electronic processing assembly that comprises a printed circuit assembly and a processing unit; and a casing assembly, that houses the transducer assembly and the electronic processing assembly. The casing assembly is configured, at an end portion, to attach to a testing object for NDE of the wooden specimen (e.g., wooden structure such as a wooden utility pole). In some examples, the casing assembly further comprises a coupling interface component that is configured to enable contact of the transducer assembly with the testing object for the NDE of the wooden specimen. The coupling attachment is designed to create a hands-free configuration for NDE of the wooden specimen using the NDE device. The NDE device may be configured to receive, from the ultrasonic transducer, ultrasonic signal data and transmit, to a computing device, the ultrasonic signal data via a data transmission component of the processing unit. A testing object may be a physical component that is inserted into a wooden specimen, where the testing object protrudes from the wooden specimen to enable an NDE device to be in contact with the testing object. Non-limiting examples of a testing object comprise but are not limited to: physical objects that are fabricated specifically for NDE testing application; uniform metallic objects (e.g., nails) or the like; and non-uniform metallic objects, among other examples. In some alternative examples, a testing object may not be required to conduct NDE described herein. For instance, a transducer horn of an ultrasonic transducer may be fabricated in a manner that the transducer horn may be directly inserted into a wooden specimen via resulting impact. Use of a tuned testing object may be preferred to optimize testing results as well as protect components of the NDE device during execution.

In examples where a testing object is utilized, an exemplary NDE may be directly connected (i.e. placed in direct contact) with the testing object. In some non-limiting examples, the NDE device is fabricated and configured to securely attach to the testing object thereby creating a hands-free NDE testing environment that is free from impediments such as human interaction, which may have an adverse effect on ultrasonic transmission and vibration of an NDE device. A case assembly may be rotatable, via the coupling interface component, to adjust contact stress between the testing object and a transducer horn of the transducer assembly.

Other non-limiting examples of exemplary components that are included in an NDE device comprise but are not limited to: a battery providing power to an NDE device; a battery holder to secure the battery within the casing assembly; mechanical guide tracks to guide insertion of assembly components in the case assembly; an end cap and/or protective shell to enable access to internal components of an NDE device while also providing protection; strategically placed apertures and/or slots to maximize interfacing between assemblies and interfacing between a testing object and a transducer assembly; one or more spacers and/or standoffs to optimize positional placement of respective assemblies during operation of an NDE device; fastening components to secure respective assemblies with the casing assembly and attach assemblies to one another; and gasket tracks and associated gaskets and/or bushings, among other examples.

In another non-limiting example, a system of two or more NDE devices are implemented to conduct NDE of a wooden specimen providing point-to-point configuration analysis. That is, two or more NDE devices may be attached to a wooden specimen, where the two more NDE devices work together for transmission and receipt of ultrasonic signal data. This type of configuration may enable a most accurate reading for time of flight (TOF) evaluation and peak energy evaluation of signal data, among other types of scientific analysis, thereby enabling testers to most accurately judge the state of the wooden specimen. In that system configuration, a first NDE device may be configured to execute in a transmitting mode, thereby providing a first point at which ultrasonic signal transmission is initiated. In the transmitting mode, the processing unit of the first NDE device interfaces with the printed circuit assembly to excite the ultrasonic transducer thereby generating ultrasonic signal data. A second NDE device may be configured to execute in a receiving mode, whereby its electronic processing assembly is configured to process transmitted ultrasonic signal data that is received from the wooden specimen (at a second point relative to the first point that a signal is initiated from). Whether or not configurations are implemented that utilize one NDE device or more, a receiving device may evaluate multiple different aspects of transmitted signal data including but not limited to TOF and peak energy. Non-limiting example of TOF and peak energy comprise but are not limited to initial TOF; TOF at various intervals; and peak energy of waveforms transmitted including peak waveform evaluation of a firm ultrasonic waveform and subsequent ultrasonic waveforms.

Furthermore, system configurations described herein may comprise one or more NDE devices interfacing with one or more computing devices. NDE devices may interface with one or more computing devices, which are utilized to receive ultrasonic signal data from the NDE devices. Received ultrasonic signal data be processed through the computing device, where results of ultrasonic signal analysis may be viewable to a tester through an NDE application/service that is executing on the computing device. Computing devices may further be configured to control operation of exemplary NDE devices. For example, through an NDE application/service, executing on a computing device, a tester can send processing commands/control commands to change a state of an NDE device (e.g., standby mode; transmitting mode; receiving mode or a hybrid transmitting/receiving mode); initiate NDE testing including transmission of ultrasonic signal data; tracking timing of signal reception; request display of results of ultrasonic signal analysis; check status of components of NDE devices including a state of a battery; and update software of an NDE device including firmware (e.g., new versions and rollbacks), among other examples. In further examples, an NDE application/service, executing on a computing device, may be configured to control scientific parameters such as voltage through transmission of commands in the NDE application/service. In some alternative examples, an exemplary NDE application/service may be specifically configured with user interface controls that enable inspectors to modify scientific parameters during NDE. Computing devices may comprise any type of device having a processor. Non-limiting examples of computing devices are subsequently provided in the foregoing description. A computing device may be configured to interface with an NDE device via a data transmission protocol. For instance, an NDE device and a computing device may communicate over a wireless connection or wired connection.

In some examples, an NDE device may be preconfigured to operate in a low-power state such as a power-off state or a standby mode. This may conserve battery power until the NDE device is to be utilized for utility pole testing. In some examples, a data transmission component of an NDE device may be configured to operate in a low-power state/standby mode until commands are received for processing. When a processing command is received at an NDE device, other components of the NDE device may be activated for execution. In alternative examples, an NDE device may be in a power-off state, where the NDE device may comprise a power on/off switch that can be toggled to prime the NDE device for receipt of processing commands. A state of an NDE device may be changed through receipt of one or more commands, for example, from a computing device that is executing an NDE application/service. For instance, a tester, wishing to execute testing on a utility pole, may launch an NDE application/service, and initiate, through a graphical user interface, transmission of a command (or commands) configured to wake up an NDE device for NDE evaluation of a utility pole that the NDE device is attached to. Exemplary modes of operation of an NDE device may comprise but are not limited to: a standby mode; a power-off mode; a power-on mode; a transmitting mode (where the NDE device is configured to initiate transmission of ultrasonic signal data); a receiving mode (where the NDE device is configured to receive ultrasonic signal data that is transmitted through a utility pole); a hybrid transmitting/receiving mode; and an update mode (where firmware updates are applied), among other examples.

Among other technical benefits, the present disclosure provides the following technical advantages over previous methods of testing structural integrity of a wooden specimen: providing a hybrid mechanical/electronic device that is specifically tailored to test for incipient decay of a wooden specimen; ability to control operation of an NDE device wirelessly, where testing data can efficiently synchronized with a testers' computing device and memorialized, via data storage such as distributed data storage), for further evaluation; ability to obtain raw ultrasonic waveforms and other data directly from a device that is attached to a wooden specimen; ability to extract from raw ultrasonic waveforms, ultrasonic attenuation, spectrogram and composite TOF measurements are derived using proprietary algorithms; ability to control a state of NDE device remotely to avoid having to manually manipulate mechanical and electrical components during operation; ability to mount an NDE device to a wooden specimen in a hands-free configuration; ability to secure an NDE device directly to a testing object that is attached to a wooden specimen; an ability to change contact points between a testing object and an NDE device; and improved accuracy in evaluating structural integrity of a wooden specimen including wooden structures, among other technical advantages.

FIG. 1 illustrates an exploded view 100 of a non-destructive evaluation (NDE) device for testing of a wooden specimen, with which aspects of the present disclosure may be practiced. The NDE device shown in FIG. 1 comprises three assemblies: a casing assembly 102; a transducer assembly 104; and an electronic processing assembly 106. The casing assembly 102 is a housing for the other electrical assembly components such as the transducer assembly 104 and an electronic processing assembly 106, providing an outer shell of the NDE device that not only protects the other assemblies but also is configured to secure the transducer assembly 104 and an electronic processing assembly 106 in an optimized position for radial evaluation of a utility pole. The casing assembly may be made of any type of rigid material including but not limited to: plastic; metal; composite plastic or metal; and alloy, polycarbonate, glass, wood, or a combination thereof, among other non-limiting examples. In one example, the casing assembly is in a cylindrical shape or tubular shape to optimize the NDE device for radial attachment to a wooden specimen. However, it is to be understood that the casing assembly may be formed in any shape without departing from the spirit of the present disclosure. Further components of a casing assembly are highlighted in subsequent figures and the accompanying description. For instance, an exemplary casing assembly 102 may comprise a base portion that houses the transducer assembly 104 and the electronic processing assembly 106; a detachable end cap portion that provides protection for and access to internal components of the NDE device and a protective coupling component 112 that is fabricated and configured to enable the NDE device to interface with a testing object that is attached to a wooden specimen (e.g., wooden structure such as a wooden utility pole).

The transducer assembly 104 comprises transducer components that convert energy from one form to another. In the present disclosure, an exemplary transducer assembly 104 comprises an ultrasonic transducer to convert electronic signal data into ultrasonic signal data. Exemplary components of a transducer such as an ultrasonic transducer are known to one skilled in the field of art and are not specifically described herein. Non-limiting examples of transducer components comprise but are not limited to: sensors; actuators; transceivers; receivers; amplifiers and a transducer horn (e.g., attachable/detachable), among other examples.

The electronic processing assembly 106 comprises electrical components that: produce electrical signal enabling the NDE device to transmit and receive ultrasonic signal; convert ultrasonic signal data into electrical signal data (e.g., digital signal data that can be utilized by computing devices); provide a power source for the NDE device; enable communication between components of the NDE device and other systems components (e.g., computing devices); and store configuration data and/or firmware to enable the NDE device to operate for its intended purpose, among other examples. Exemplary electronic processing components that are designed to enable functionality described herein are known to one skilled in the field of art are not specifically described herein. However, for ease of understanding, the electronic processing assembly 106 includes components that comprise but are not limited to: a printed circuit assembly (PCA); a processing unit (that may be a component of a processing assembly or connected with the PCA); a data transmission component (that may be a component of a processing assembly or connected with the PCA); and a power source (e.g., battery), among other examples.

FIG. 1 illustrates the interfacing between the respective assemblies referenced above. As referenced in the foregoing, the transducer assembly 104 and the electronic processing assembly 106 are housed within the casing assembly 102, where the transducer assembly 104 and the electronic processing assembly 106 are secured internally within the casing assembly 102. The transducer assembly 104 and the electronic processing assembly 106 are further connected to each other within the casing assembly 102. For example, the electronic processing assembly 106 is connected to the transducer assembly 104 via fastening components. Fastening components may be any hardware that joins or affixes two objects together. Any known type of fastening component may be utilized to secure the transducer assembly 104 and the electronic processing assembly 106 to one another forming a combined assembly. In one example, the transducer assembly 104 and the electronic processing assembly 106 are secured to one another using four socket head screws 108.

When resonant excitation is induced in an ultrasonic transducer (of the transducer assembly 104), piezoelectric material, space is needed to allow the material to expand and contract in the lengthwise direction. To create a desirable space between the transducer assembly 104 and the electronic processing assembly 106, one or more spacers 110 may be added within the casing assembly to maintain certain clearance to account for such physical oscillations. Any type of spacer, as known to one skilled in the field of art, may be incorporated into the NDE device. In one non-limiting example, the one or more spacers 110 are four un-threaded spacers. Usage of non-threaded components may help minimize disturbances to signals that are transmitted and received via the NDE device.

The combined assembly is further housed in the casing assembly 102 using fastening components 114. As a non-limiting example, four cap screws are placed in four hex slots 116, located at the front end of the casing assembly 102, to secure the combined assembly to the physical shell of the casing assembly (e.g., a base portion of the casing assembly 102). The protective coupling component 112 is screwed onto an end portion of the casing assembly 102 closest to the transducer assembly 104. For example, the protective coupling component 112 is attachable to the transducer horn of the ultrasonic transducer to: enable direct contact between the ultrasonic transducer and a testing object; protect the NDE device from any static electrical discharge, and also allow the NDE device to be mounted easily to a testing object in a hands-free configuration that does not require additional mechanical or physical supports. The protective coupling component 112 may be attachable/detachable from a base portion of the casing assembly 102. In some examples, the protective coupling component 112 may be sold to consumers in a form where it is the detached from the base portion. As referenced above, in some configurations, an NDE device may not require a protective coupling component 112 for NDE testing though the protective coupling component 112 may be beneficial in that it creates a hands-free configuration for an inspector and also produces more accurate testing results. A user of the NDE device may attach the protective coupling component 112 to a testing object that is secured in a wooden specimen. The base portion of the casing assembly 102 may then be attached to the protective coupling component 112 that is mounted to the testing object (and therefore mounted to the wooden specimen). In other examples, the NDE device may be presented to consumers in a form where the protective coupling component 112 is attached to the base portion of the casing assembly.

FIG. 2 illustrates an exploded view 200 of an NDE device that highlights an electronic processing assembly, with which aspects of the present disclosure may be practiced. The electronic processing assembly may be an electronic processing assembly 106 as described in the foregoing description of FIG. 1. The electronic processing assembly includes a plurality of components that comprise but are not limited to: the PCA 202; a carrier 204; a front plate 206; a data transmission component 222; and a processing unit 226, among other examples. Examples of PCAs are known to one skilled in the field of art and are not described in explicit detail herein.

The PCA 202 is secured on the top side of the carrier 204 using fastening components 224 (e.g., two tap screws or any type of fastening component). Fastening components described in the present disclosure may be comprised of any material as known to one skilled in the field of art including but not limited to: metallic or plastic materials. Through apertures 210 on the PCA 202 (e.g., two apertures/holes 210 located at the corners of the PCA 202 as shown in FIG. 2), the fastening components 224 may secure the PCA 202 to the carrier 204. The PCA 202 may further comprise input/output (I/O) terminals 208, that enable the PCA 202 to be connected with a transducer assembly, thereby enabling the ultrasonic transducer to be excited and receive ultrasound. In some examples, the PCA 202 is connected to the transducer assembly via a wired connection (e.g., via terminal wires). In alternative instances, Bayonet Neill-Concelman (BNC) cable can be used to reduce external electromagnetic interference (EMI). At a back end of the carrier, an L-protector 212 or the like is used to protect the PCA 202 mechanically from any unintended external impacts. Moreover, to stabilize the PCA 202 during usage and protect respective components of the PCA 202, PCA standoffs 216 are attached to a top portion of the carrier 204 where the PCA 202 may be attached. PCA standoffs 216 may be comprised of any non-conductive material.

Additionally, FIG. 2 illustrates a battery holder 214, which is fitted in the space on a bottom side of the carrier 204. Terminal wires (not shown) from the battery holder 214 are routed around the carrier 204 and soldered to the source terminals of the PCA 202. NDE device may further comprise a battery (not shown) providing a power source for the NDE device. A battery may attachable/detachable with the battery holder 214. In some cases, an exemplary battery may be rechargeable (e.g., Lithium ion or the like), rechargeable via a remote source (e.g., wireless charging including other devices with power sources) and in other cases the battery may be a one charge use power source. Examples of batteries that may be utilized as a power source for an NDE device are known to one skilled in the field of art. In most use cases, inspectors would not need to access the battery or any other internal components to conduct NDE of a utility pole. In some alternative instances, the NDE device may have an interface, through its casing assembly, that enables users to plug a charging cable into the NDE device to charge the battery without requiring the NDE device to be disassembled. However, as identified above, the NDE device may operate in a low-power state when not in use, thereby limiting battery consumption and extending the life of the battery for actual device usage.

Furthermore, the front plate 206, connecting to the carrier 204 of the PCA 202 consists of a T-channel 218 and a key slot 220 (e.g., rectangular key). The T-channel 218 provides an easy cable routing path connecting a transducer to the PCA 202. The key slot 220 is configured to allow the PCA 202 to slide into the carrier 204 securely with a proper orientation for operation.

The PCA 202 may further comprise, electrical component such as a data transmission component 222 and a processing unit 226. The data transmission component 222 is a hardware component configured to enable data to enable receipt and/or transmission of data between an NDE device and another computing device. For example, control commands for executing processing may be received, from a computing device, at the NDE device via the data transmission component 222. The data transmission component 222 may be further utilized to transmit testing data (e.g., raw and/or filtered ultrasonic signal data) to a computing device for further analysis. The data transmission component 222 may be configured to operate using a specific data transmission protocol or multiple data transmission protocols. For instance, a computing device may utilize the data transmission component 222 to communicate with the NDE device via a wired connection and/or a wireless connection. In one non-limiting example, the data transmission component 222 is configured for transmission and/or receipt of data through a wireless protocol such as Bluetooth. However, it is to be recognized that the data transmission component 222 is configurable to work with any type of data transmission protocol. Non-limiting examples of applicable wireless data transmission protocols comprise but are limited to: Bluetooth transmission, infrared transmission, radio frequency transmission, Wi-Fi communication, cellular transmission, satellite transmission, and global positioning system transmission, among other examples.

A processing unit 226 is configured to control the electronic circuitry of the PCA 202 to carry out programmed instructions for operations related to NDE of a wooden specimen. The processing unit may be any type of processing component that comprises one or more processors. In one example, the processing unit 226 is a microprocessor to accompany the smaller size of the NDE device. The processing unit 226 may comprise memory that stores programmed instructions for operation of the NDE device. In alternative examples, the PCA 202 may further comprise one or more memory cells that can be utilized to store data in cases where the extra memory is required for processing. In alternative instances, the NDE device may be configured to interface with remote data storage (e.g., distributed data storage accessed by the processing unit 226 via the data transmission component 222).

Figure 3:
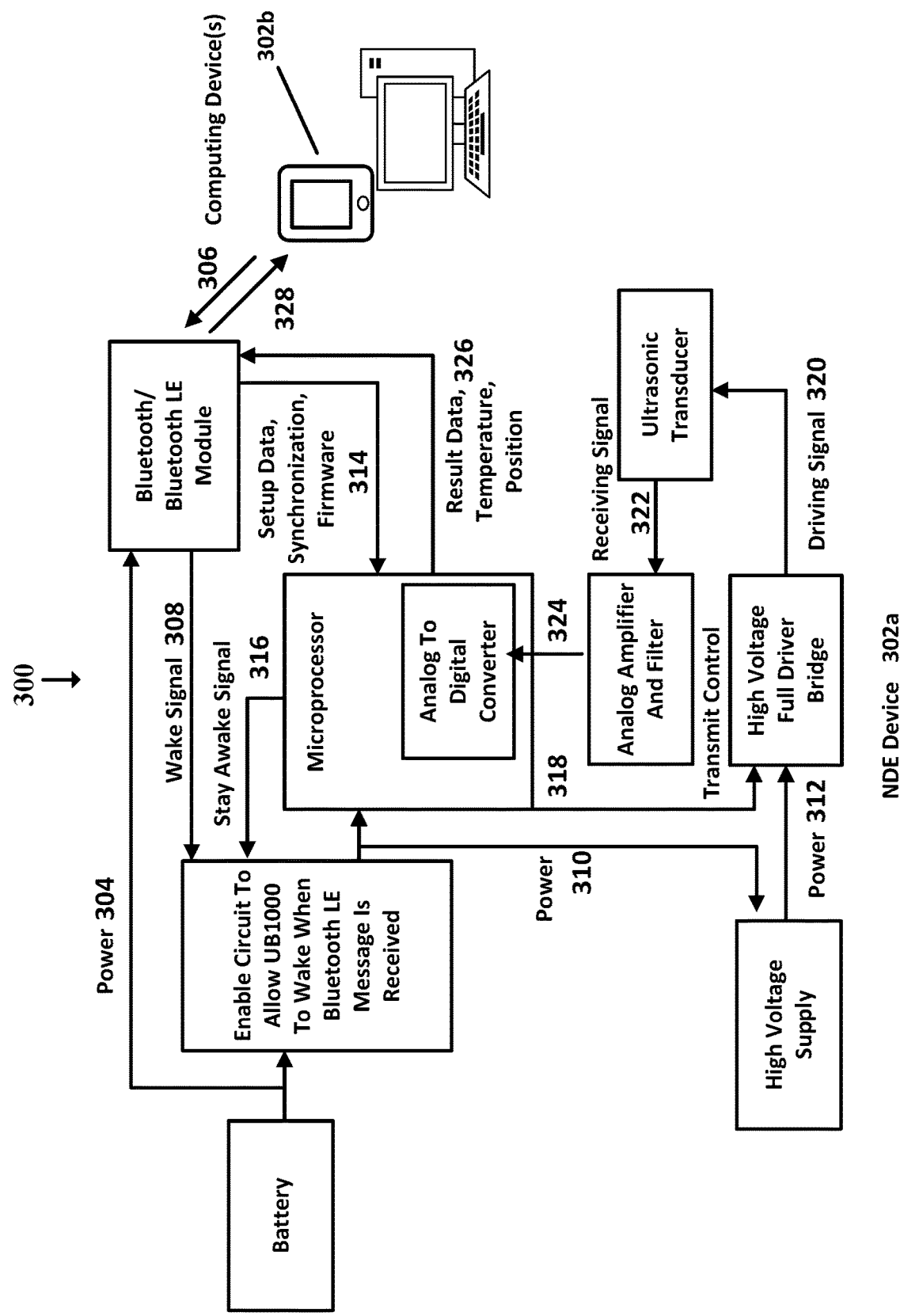
FIG. 3 illustrates a process flow diagram of a non-limiting interaction between an NDE device and one or more computing devices, with which aspects of the present disclosure may be practiced.

FIG. 3 illustrates a process flow 300 of a non-limiting interaction between an NDE device 302a and one or more computing devices 302b, with which aspects of the present disclosure may be practiced. The one or more computing devices 302b may be utilized to control operation of the NDE device 302a for execution of NDE of a utility pole. During execution, the NDE device 302a performs two critical functions: transmission and reception of ultrasound signals that are utilized to assess structural integrity of a wooden specimen when the NDE device 302a is attached to the wooden specimen.

Process flow step 304 illustrates functionality of the NDE device 302a at the point where a battery acts as a power source thereby providing battery power to a data transmission component (e.g., Bluetooth/Bluetooth LE module). As referenced in the foregoing description, an exemplary NDE device 302a may be configured to operate in a low-power mode (or standby mode) prior to receipt of control commands to initiate processing. To achieve low power consumption due to inactivity, the NDE device 302a may remain in a standby mode until an initial wake message is received. In one example, the data transmission component is a Bluetooth Low Energy (LE) module or the like, that is configured to provide a minimal amount of power to the data transmission component to enable the data transmission component to operate in a standby mode. In the standby mode, the data transmission component waits for a control signal to direct the processor to awake the NDE device 302a for operation. In alternative examples, the NDE device 302a may be configured with a power on/off switch that is used as a trigger to awake circuitry of the NDE device.

In any example, a computing device 302b may transmit a control command (or commands) to the data transmission component that is then passed to the processing unit to awaken the NDE device 302a (e.g., change the mode of operation from a standby mode to a power-on mode). Process flow step 306 highlights interaction a computing device 302b and the data transmission component, where a control command to wake up the NDE device 302a may be transmitted from the one or more computing devices 302b to the data transmission component.

Continuing flow 300, at process flow step 308, the data transmission component is configured to propagate a wake signal to the PCA. Based on receipt of that wake signal, the PCA is configured to provide an electrical current (process flow step 310) to other PCA components in preparation of exciting the ultrasonic transducer. Examples of other PCA components comprise but are not limited to: a high voltage supply, and the processing unit. At process flow step 312, power is then subsequently supplied to a bridge driver (e.g., high voltage full bridge driver). This prepares the NDE device 302a by energizing the circuit to either transmit or receive ultrasonic signal data depending on a set configuration of the NDE device 302a. For instance, a discharge of energy from a high voltage supply is sent to a bridge driver (e.g., full bridge driver) to generate a modulated driving signal usable to excite the ultrasonic transducer.

Flow 300 may proceed to process flow step 314, where a synchronization signal is transmitted to initiate ultrasonic processing. A synchronization signal may be transmitted from a computing device 302b to the processing unit via the data transmission component. An exemplary synchronization signal is a control command that is used to initiate transmission of ultrasonic signal data. Ultrasonic signal data may be initiated at the NDE device 302a, received at the NDE device 302a or a combination thereof, where multiple NDE devices are utilized to process ultrasonic signal data. In some alternative technical scenarios, other types of data may be transmitted between a computing device 302b and the processing unit of the NDE device. Non-limiting examples of such data comprise but are not limited to: setup data to configure the NDE device 302a (e.g., the processing unit); firmware data (including updates); and control commands to change a state of the NDE (e.g., into a transmitting mode; a receiving mode; a standby mode; a hybrid transmitting/receiving mode), among other examples.

As referenced above, a device configuration is modifiable based on control commands received from the one or more computing devices 302b. In some alternative scenarios, a wake signal (or a stay awake signal) may be a trigger to initiate processing of an electrical signal through the PCA. For example, a trigger for transmitting a signal to a PCA, for initiation of an electrical current to begin ultrasonic evaluation, may occur when a synchronization signal is received to begin recording of signal data (process flow step 314). This presents a different technical scenario from that in which the PCA is prepared prior to receipt of the synchronization signal. In any case, the processing unit may transmit a signal to the PCA to keep the PCA awake and active for processing (process flow step 316). This may prevent the NDE device 302a from entering a standby mode, low power state or power-off state, etc., during ultrasonic signal processing.

Once a synchronization signal is received by the processing unit through the data transmission component, a time of transmission is determined and recording of raw ADC data begins. Flow 300 proceeds to process flow step 318, where a transmit signal is propagated from the processing unit to the bridge driver (e.g., high voltage full bridge driver) of the PCA. The transmit control is then further propagated at process flow step 320 from the bridge driver to ultrasonic transducer. Through the ultrasonic transducer, active ultrasound energy is converted into analog signal (process flow step 322). Ultrasonic signal data is then subsequently filtered (to remove noise) and amplified (process flow step 324). The resulted signal is converted into digital signal using an analog to digital converter (ADC) embedded in the processing unit. Based on the time of transmission and the initial detectable peak in the digital waveform, initial TOF reading is obtained. Resulting raw ADC data, computed initial TOF and other information about the system status (e.g. operating temperature, position, etc.) are transmitted from the processing unit to the data transmission component (process flow step 326) and then from the data transmission component to the computing device 302b (process flow step 328) for further processing. Algorithmic processing to evaluate ultrasonic signal data and other types of recorded data from NDE of a wooden specimen may be stored in memory and executed by the NDE device 302a or alternatively executed via the computing device 302b once said data is propagated to the computing device 302b.

FIG. 4 illustrates an exploded view 400 of an NDE device that highlights a transducer assembly, with which aspects of the present disclosure may be practiced. In the non-limiting example shown in FIG. 4, the transducer assembly 7 comprises: an ultrasonic transducer 402 a first fastening component 404 (e.g., a collar clamp) and a second fastening component 406 (e.g., a C-clamp), among other components. The ultrasonic transducer 402 is positioned between the first fastening component 404 and the second fastening component 406. The ultrasonic transducer 402 is secured by inserting additional fastening components 408 (e.g., four socket head screws) through fabricated apertures 410 (e.g., four unthreaded holes) in the first fastening component 404 that engage with threaded holes of the second fastening component 406. As a non-limiting example, by turning the additional fastening components 408, the ultrasonic transducer 402 is clamped down with adjustable strength. As it expands and contracts radially due to resonant excitation, in order to retain this radial oscillation, two gasket tracks 412 (e.g., O-ring tracks) are created to provide the space for the placement of two rubber O-rings bushings 414. A front plate of the second fastening component 406 has a key slot 416 (e.g., rectangular key) to ensure a correct orientation before being the transducer assembly is inserted into an enclosure of the case assembly. An enclosure of the casing assembly may comprise extruded tracks 418 to guide insertion of the transducer assembly into the case assembly.

Figure 5:
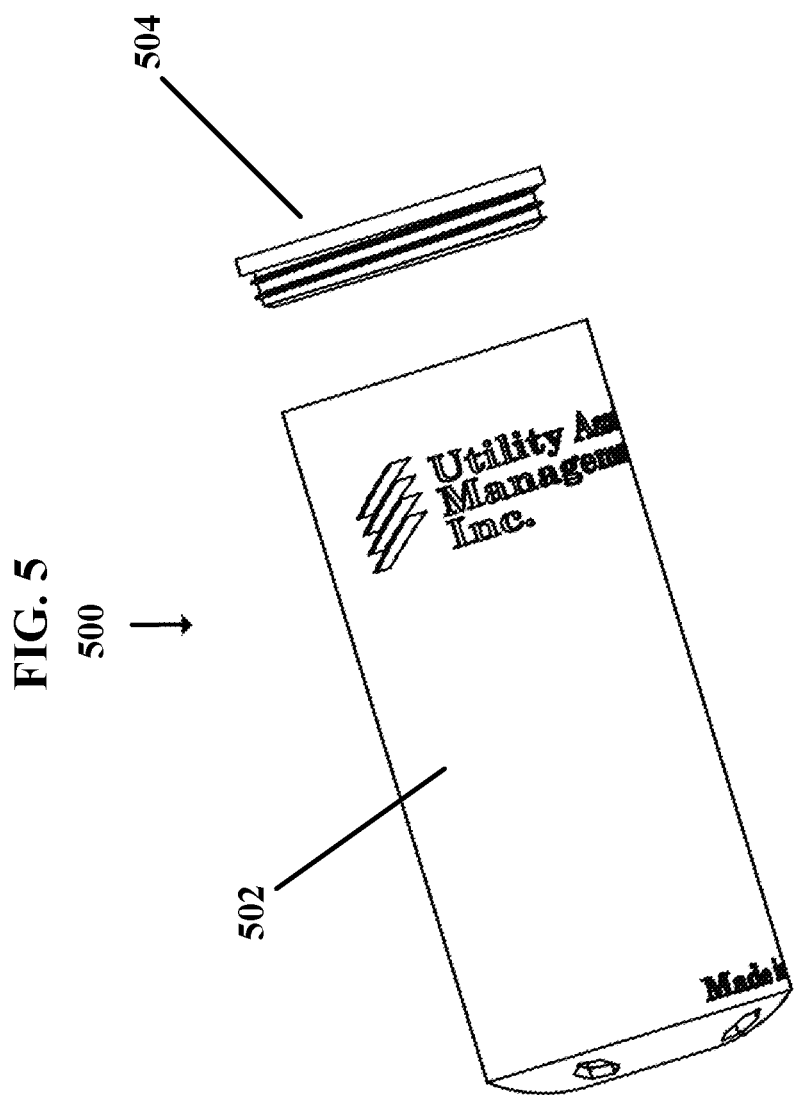
FIG. 5 illustrates a side view of an NDE device that highlights a case assembly, with which aspects of the present disclosure may be practiced.

FIG. 5 illustrates a side view 500 of an NDE device that highlights a case assembly, with which aspects of the present disclosure may be practiced. As a non-limiting example, an exemplary casing assembly may comprise a cylindrical enclosure 502 and a detachable end cap 504. The cylindrical enclosure 502 corresponds with a base portion of the case assembly that houses the transducer assembly and the electronic processing assembly. As identified in the foregoing, a shape of the base portion of the case assembly may vary without departing from the spirit of the present disclosure. At a front end of the cylindrical enclosure 502, the coupling interface component may be attached as shown in subsequent figures. The back end of the case is threaded allowing the detachable end cap 504 to be twisted into the case to provide mechanical protection.

FIG. 6 illustrates a side view 600 of an NDE device that provides an exploded view of a case assembly, with which aspects of the present disclosure may be practiced. The case assembly may be comprised of any type of material including but not limited to: metal, plastic, glass, wood, polycarbonate, composite materials and a combination thereof, among non-limiting examples. In some examples, metal is preferred because it can shield electromagnetic interference (EMI). The side view shown in FIG. 6 highlights how components such as the transducer assembly and electronic processing assembly are secured within an enclosure of the case assembly (e.g., a base portion) as well as illustrates end portions of the case assembly showing how attachable components such as an end cap and/or a coupling interface component may be attached to a base portion of the case assembly.

The cylindrical enclosure described in FIG. 5 and further shown in FIG. 6 comprises an extruded track 602, hex apertures 604 (e.g., four hex holes) on each end of the casing assembly, a transducer well 606 and a threaded interface 608. As previously indicated, when the electronic processing assembly and transducer assembly are combined, key slots are utilized to make sure that the assemblies are properly lined within a base portion of the case assembly. A combined assembly may be slid into the cylindrical enclosure along the extruded track 602 to ensure a desired orientation is maintained. This mechanism also helps to ensure that the combined assembly does not rotate in the cylindrical enclosure if an external torque is applied to the transducer horn when the coupling interface component is attached to a threaded transducer horn of the transducer assembly. The hex apertures 604 are utilized to enable secure connection of the transducer well 606 and the threaded interface 608 on the end portions of the case assembly. For example, fastening components may be inserted into the hex apertures 604 to limit mobility of the respect wells and ensure tight connection. The hex apertures 604 may be threaded or un-threaded. The transducer well 606 provides a space allowing the ultrasonic transducer to vibrate without any obstructions. The threaded interface 608 provides a connection point allowing the coupling interface component to be seamlessly attached with a base portion of the case assembly. It is to be understood that the dimensions of the threaded interface 608 may be changed to accommodate for different dimensions of testing objects (e.g., different nail head dimensions) without departing from the spirit of the present disclosure. Alternative examples (not shown) may replace a threaded interface 608 with any type of fastening component as known to one skilled in the field of art.

FIG. 7 illustrates a side view 700 of an NDE device that provides a 3D view of a coupling interface component, with which aspects of the present disclosure may be practiced. The coupling interface component may be comprised of any type of material including but not limited to: metal, plastic, glass, wood, polycarbonate, composite materials and a combination thereof, among non-limiting examples. The coupling interface component comprises a U-channel 702, an interface well 704 (similarly references in 608 of FIG. 6) and a circular tapped aperture 706. A threaded transducer horn may be connected with the ultrasonic transducer through circular tapped aperture 706 that exists at an end portion of the case assembly. For example, a transducer horn may be screwed into the circular tapped aperture 706 enabling the transducer horn to be secured to the coupling interface component to create a hands-free connection. The u-channel 702 acts as a guide for interfacing the testing object (e.g., a nail or modified metallic object that is configured for NDE of a utility pole) with the coupling interface component. For example, a head of a nail that is protruding from a utility pole may be guided into the coupling interface component via the U-channel 702. The testing object is housed by the interface well 704, allowing a front of a transducer horn to be in contact with the testing object (e.g., nail head) permitting the propagation of acoustic wave into the body of the mounted testing object. By rotating the NDE device in either clockwise or counter clockwise direction, the contact stress between the testing object and the transducer horn can be adjusted.

Figure 8:
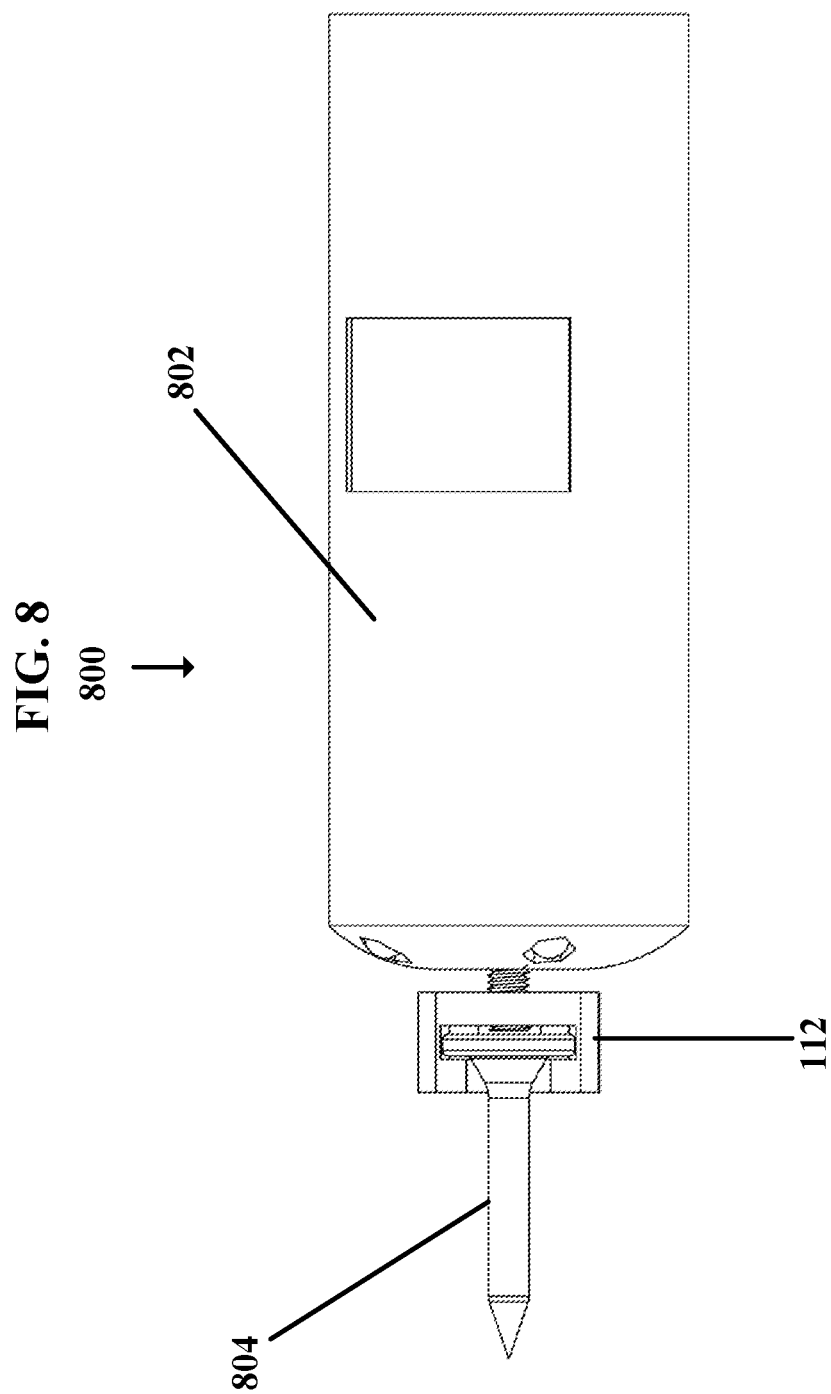
FIG. 8 illustrates a side view that highlights interfacing between a testing object and an NDE device for testing of a wooden specimen, with which aspects of the present disclosure may be practiced.

FIG. 8 illustrates a side view 800 that highlights interfacing between a testing object and an NDE device testing of a wooden specimen, with which aspects of the present disclosure may be practiced. Side view 800 illustrates an orientation of a base portion of the case assembly 802 that is connected with the coupling interface component 112 having a testing object 804 mounted within the coupling interface component 112. As shown in side view 800, the base portion of the case assembly 802, the coupling interface component 112 and the testing object 804 are aligned in a radial configuration that follows how a testing object protrudes from a wooden specimen that is a test subject.

Figure 9:
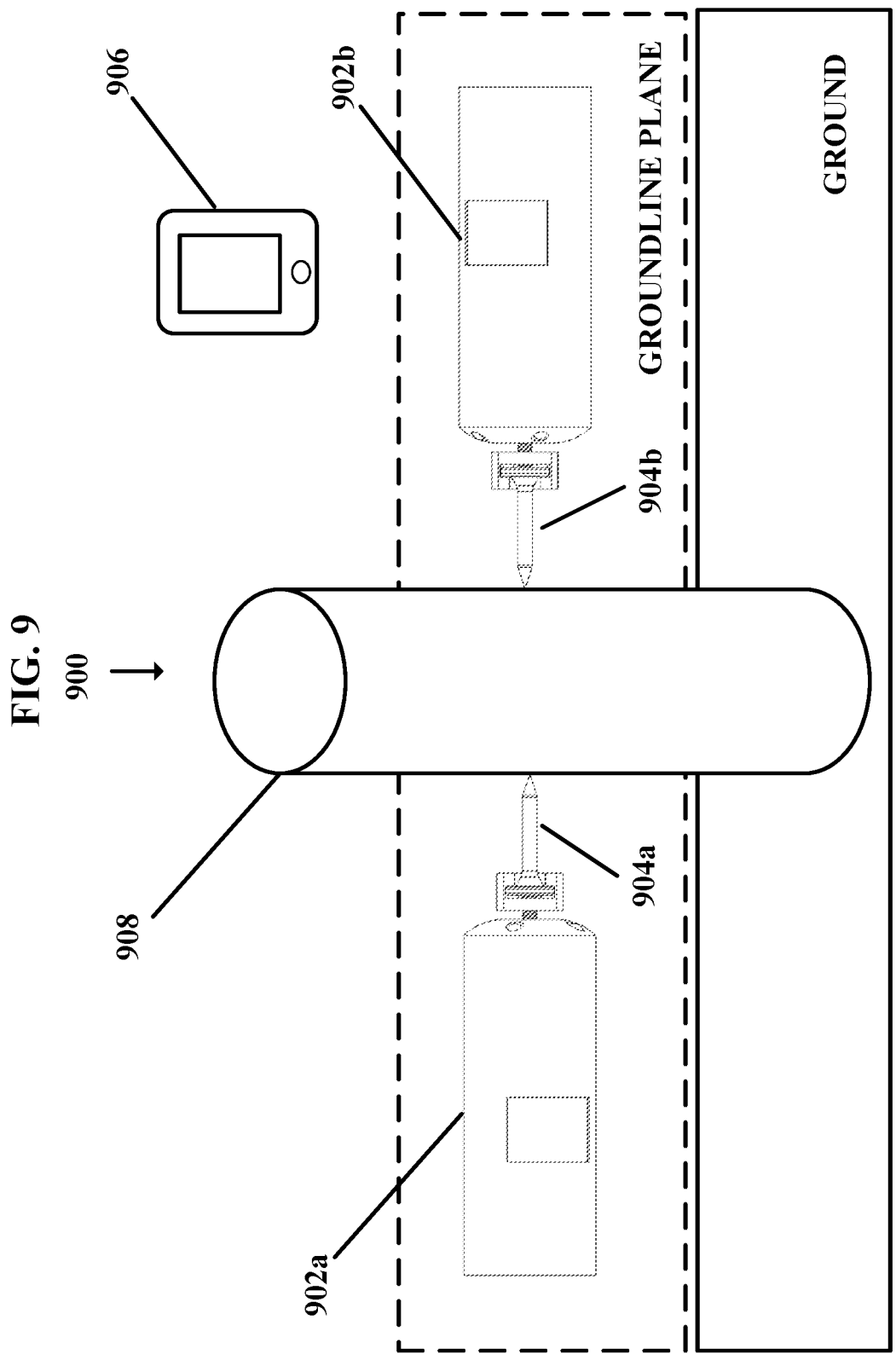
FIG. 9 illustrates a side view highlighting interfacing between exemplary NDE devices and a wooden utility pole, with which aspects of the present disclosure may be practiced.

FIG. 9 illustrates a side view 900 highlighting interfacing between exemplary NDE devices and a wooden utility pole, with which aspects of the present disclosure may be practiced. Side view 900 illustrates a system configuration where multiple NDE devices, 902a and 902b respectively, are interfacing with a computing device 906 (e.g., tablet device) for NDE of a wooden utility pole 908. Side view 900 provides a non-limiting example of placement of NDE devices 902a and 902b on opposing sides of the wooden utility pole 908, where the NDE devices, 902a and 902b are attached to testing objects, 904a and 904b respectively, that are placed proximate to a groundline plane of the wooden utility pole. This is because incipient decay of the wooden utility pole 908 often starts right above the ground line (e.g., six inches above grade), making that an optimal place to test the structural integrity of the wooden utility pole 908. It is to be understood that testing objects and NDE devices may be placed at any portion of the wooden utility pole 908 without departing from the spirit of the present disclosure. In an alternative example, first and second NDE devices are placed at differing positions on the wooden utility pole 908. For instance, a first NDE device is attached proximate to a groundline plane of the utility pole, and a second NDE device is attached to the utility pole 908 at a portion of the utility pole that is above a location of the first NDE device. In other examples, a plurality of NDE devices may be attached to the wooden utility pole 908 at varying heights along the wooden utility pole 908. Developers may select optimal placement positions NDE devices based on any number of factors including but not limited to: different environmental conditions; analysis of NDE testing data (e.g., indicating patterns in testing data that may indicate most accurate testing results); and visual inspection of a wooden utility pole, among other examples. In some examples, baseline readings may be obtained at the ground line or proximate to the ground line (e.g., six inches above), where additional rounds of testing may adjust placement of NDE devices to compare with the baseline readings.

The computing device 906 may be configured to interface with the NDE devices 902a 902b. For example, wake signals, control signals and/or synchronization signals may be transmitted from the computing device to the NDE devices 902a 902b to initiate NDE of the utility pole 908. As an example, the computing device 906, that is executing an NDE application/service, may send control signals (e.g., setting signals) to configure a first NDE device 902a in a transmitting mode that initiates transmission of ultrasonic signal data through the utility pole 908. The computing device 906, that is executing an NDE application/service, may send control signals (e.g., setting signals) to configure a second NDE device 902b in a receiving mode that is configured to receive transmitted ultrasonic signal data that is received through the wooden utility pole 908. In an exemplary configuration, the NDE application/service is configured to detect ultrasonic signal data that is: 1) transmitted radially though the wooden utility pole 908 from a first point (first NDE device 902a) to a second point (second NDE device 902b); and 2) transmitted around the wooden utility pole 908 from a first point (first NDE device 902a) to a second point (second NDE device 902b). This may provide a more comprehensive evaluation of the structural integrity of the wooden utility pole 908 than visual inspection or simply evaluating TOF through a utility pole. In further examples, inspectors of the wooden utility pole 908 may be able to control scientific parameters of an NDE through the NDE application/service. The energy of wave transmitted to a wood pole is directly related to the voltage generated by the PCA of an NDE device. In the case when an inspector wants to vary the energy being transmitted to a wood utility pole 908, voltage varying command can be sent to the PCA through an NDE application/service executing on the computing device 906. In some non-limiting examples, the voltage is varied between 20 volts to 80 volts maximum, but it is possible using the same circuit design to achieve higher excitation voltage. An exemplary NDE device and system comprising a computing device 906, executing an NDE application/service, is configurable to enable inspectors to control voltage transmission during NDE of a wooden specimen.

Figure 10:
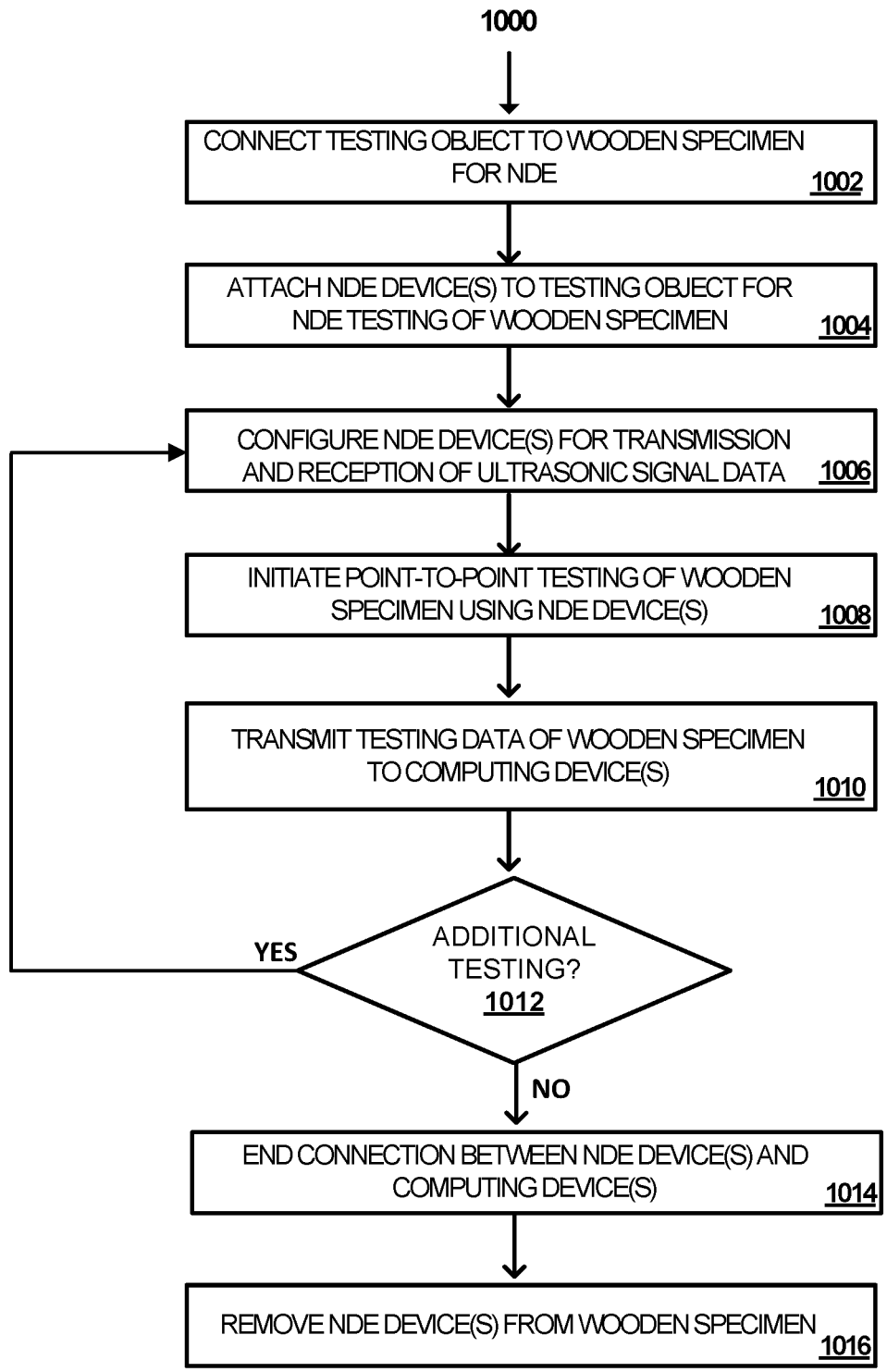
FIG. 10 illustrates an exemplary method for execution of NDE of a wooden specimen, with which aspects of the present disclosure may be practiced.

FIG. 10 illustrates an exemplary method 1000 for execution of NDE of a wooden specimen, with which aspects of the present disclosure may be practiced.

Method 1000 begins at processing operation 1002, where one or more testing objects are connected to a wooden specimen for NDE of the wooden specimen. As a non-limiting example, testing objects may be hammered into the wooden specimen at a desired location. As referenced in the foregoing, a desired location may be proximate to a groundline of the wooden specimen. For instance, two nails (or customized metallic objects for NDE testing) may be hammered into opposite sides of the wooden specimen forming a 2D groundline plane that is parallel to the ground and a few inches above the ground. This may be an optimal position for most accurately detecting incipient decay within a wooden specimen.

Flow of method 1000 may proceed to processing operation 1004, where one or more NDE devices are attached to the one or more testing objects for NDE testing of the wooden specimen. For example, the coupling interface component of an NDE device may be attached to a transducer horn of an ultrasonic transducer of the NDE device. The testing object (e.g., a head portion) may be placed in an interface well of the coupling interface component. The NDE device may be slowly rotated in a clock-wise direction until the transducer horn is in contact with the testing object and the NDE is stabilized mechanically. This enables a hands-free configuration of the NDE where an inspector does not need to hold the NDE device against the testing object.

However, in alternative configurations, the NDE device may emit a coupling interface component. In such a configuration, a transducer horn may be attached to the base portion of the casing assembly and a user may manually hold the NDE device against the testing object so the transducer horn contacts the testing object. In this alternative configuration, the user would manually hold the NDE device against the testing object until the ultrasonic testing is complete. In some alternative instances, the NDE device may be further configured with auditory components to enable the NDE device to omit sound to indicate start/completion of ultrasonic testing. This may be helpful in the alternative instances where the NDE device omits a coupling interface component and the NDE device is not in a hands-free configuration. In yet another alternative instance, the NDE application/service is programmed to utilize the speakers of a computing device to provide auditory indication of ultrasonic testing as opposed to requiring the NDE device to be modified.

In any instance where an NDE is in an appropriate testing position, flow of method 1000 proceeds to processing operation 1006. At processing operation 1006, the one or more NDE devices are configured for ultrasonic testing. For example, the one or more NDE devices may be configured to transmission and/or reception of ultrasonic signal data. As referenced in the foregoing description, this may occur by setting the NDE device in a specific mode (e.g., transmitting mode or receiving mode). This may occur through interfacing between one or more computing devices and the one or more NDE devices that are configured to communicate with a computing device via the data transmission component. The data transmission component enables interfacing between a computing device and an NDE device via a wired connection or a wireless connection as described previously.

As referenced in the foregoing description, inspectors may be able to control scientific parameters of NDE through an exemplary NDE application/service executing on a computing device that is configured to communicate with an NDE device. For example, voltage varying commands may be propagated from a computing device to control an NDE device.

Establishment of a connection between a computing device and an NDE device has been described in the foregoing description, including the description of FIG. 3. Non-limiting examples of actions that are performed in processing operation 1006 comprise but are not limited to: opening an NDE application/service on a computing device; confirming that the one or more NDE devices are detected by the NDE application/service including sending one or more commands that comprise wake signals and/or control signals; and confirming that the one or more NDE devices are configured in an appropriate mode for conducting NDE of the wooden specimen. In instances where only one NDE device is used, the NDE device may be configured to both transmit and receive ultrasonic signal data. This may be applicable to detecting ultrasonic signal data both radially through a wooden specimen as well as around the wooden specimen. That is, an NDE device may be set in a single operating mode or may be configured in a hybrid transmit/receive mode depending on the wishes of the inspectors. It is likely that utilizing more than one NDE device may provide most accurate readings when detecting TOF and peak energy of ultrasonic signal data.

Flow may proceed to processing operation 1008, wherein point-to-point testing of a wooden specimen is initiated using the one or more NDE devices. Processing operation 1008 may comprise following programmed instructions in the NDE application/service, executing on the computing device, to initiate point-to-point testing of the wooden specimen using the one or more NDE devices. For example, the NDE application/service may provide user interface elements that, when selected, enable tracking of timing and peak energy of ultrasonic signal data; transmission of ultrasonic signal data from a first point to a second point, where the ultrasonic signal data is transmitted from an NDE device that is configured to transmit the ultrasonic signal data. As referenced in the foregoing description the first point and the second point may be established by a single NDE device or may correspond with different NDE devices. The one or more NDE devices are configured to collect raw ultrasonic signal data (e.g., raw ADC data) based on programmed instructions that are executed by the one or more NDE devices.

After a few seconds, the NDE testing data (e.g., ultrasonic signal data) may be collected. Flow of method 100 may proceed to processing operation 1010, where the ultrasonic signal data is transmitted to the one or more computing devices for presentation through a graphical user interface of the NDE application/service.

Processing of method 1000 may proceed to decision operation 1012, where it is determined whether additional testing is to be commenced using the one or more NDE devices. In some instances, testing data may not have been accurately captured or may have experienced an interruption. This may have occurred in instances where an inspector is manually holding an NDE device and does not keep it steady or there is human error in operation of the NDE device or the NDE application/service, among other issues. In some examples, an inspector may wish to modify a contact point between a testing object and a transducer horn. In the instances where additional testing is to commence, flow of decision operation 1012 branches YES. In that case, processing of method 1000 returns to processing operation 1006, where devices may be reconfigured for NDE of the utility pole. In some instances, the inspector may simply reinitiate the point-to-point testing through the NDE application/service. In instances where no additional testing is necessary, flow of decision operation 1012 branches NO. In that case, processing of method 1000 proceed to processing operation 1014.

At processing operation 1014, a connection between the one or more NDE devices and the computing devices is ended. This may occur through the issuance of command controls via the NDE application/service (e.g., ending testing, changing the mode of operation). Flow of method 1000 may then proceed to processing operation 1016, where an NDE device and testing object may be removed from the wooden specimen.

It is further worth noting that given the tailored configuration of the NDE device and its ability to breakdown different aspects of ultrasonic signal data, it is not required that the testing object be drilled deeply into the wooden specimen. The testing configuration of the present disclosure is designed so that the testing object does not need to penetrate far enough into the wooden specimen that the protective layering is damaged. Thus, the testing configuration of the present disclosure does not correlate to expediting decay of a wooden specimen for the sake of testing the structural integrity of the wooden specimen.

Figure 11:
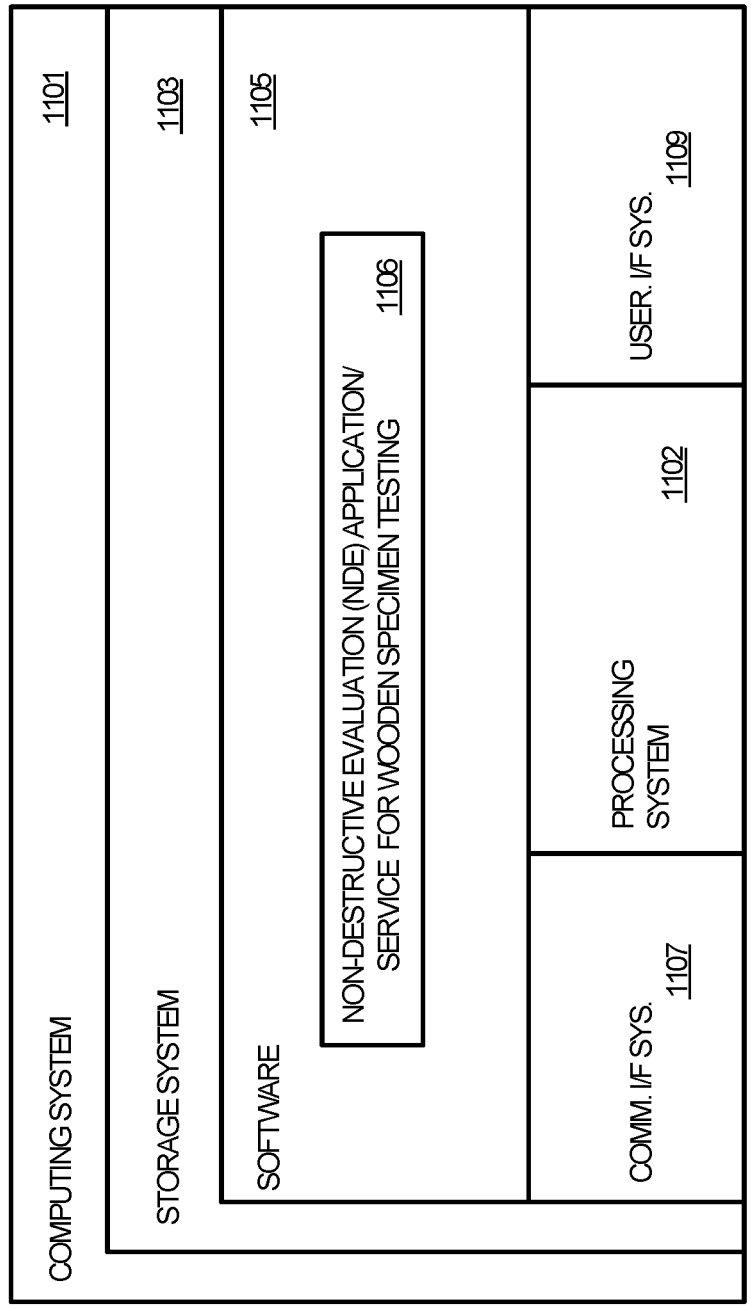
FIG. 11 illustrates a computing system suitable for implementing processing operations described herein related to NDE of a wooden specimen, with which aspects of the present disclosure may be practiced.

FIG. 11 illustrates a computing system 1101 suitable for implementing processing operations described herein related to NDE of a wooden specimen, with which aspects of the present disclosure may be practiced. Computing system 1101 may be implemented as a single apparatus, system, or device or may be implemented in a distributed manner as multiple apparatuses, systems, or devices. For example, computing system 1101 may comprise one or more computing devices that execute processing for applications and/or services over a distributed network to enable execution of processing operations described herein over one or more services. Computing system 1101 comprises, but is not limited to, processing system 1102, storage system 1103, software 1105, communication interface system 1107, and user interface system 1109. Processing system 1102 is operatively coupled with storage system 1103, communication interface system 1107, and user interface system 1109. Non-limiting examples of computer system 1101 comprise but are not limited to: smart phones, laptops, tablets, PDAs, desktop computers, servers, smart computing devices including television devices and wearable computing devices, e-reader devices, and conferencing systems, among other non-limiting examples. Other types of processing devices may be utilized as computer system 1101 without departing from the spirit of the present disclosure.

Processing system 1102 loads and executes software 1105 from storage system 1103. Software 1105 includes one or more software components 1106 that execute an NDE application/service for testing of a wooden specimen. In some examples, computing system 1101 may be a device that a user utilizes to interface with an NDE device via the NDE application/service for wooden specimen testing 1106. For example, computing device 1101, through execution of the NDE application/service for wooden specimen testing 1106, interfaces with an NDE device via a data transmission component of the NDE device as described in the foregoing description. The computing device 1101 may interface with an NDE device via wired connection or wireless connection including any of data transmission protocols described herein as well as other known methods of data transmission as known to one skilled in the field of art. When executed by processing system 1102, software 1105 directs processing system 1102 to operate as described herein for at least the various processes, operational scenarios, and sequences discussed in the foregoing implementations. Computing system 1101 may optionally include additional devices, features, or functionality not discussed for purposes of brevity.

Computing system 1101 may further be utilized to execute control operation of NDE devices, for example, where NDE devices may be configurable to change between described modes of operation either by direct commands, transmitted from computing system 1101 or via a conclusion of programmed activity (e.g., an NDE enters a standby mode when programmed processing is completed and/or NDE device disconnected/removed). Examples of modes of operation of an NDE comprise but are not limited to: a standby mode; a transmitting mode; a receiving mode; and a hybrid transmitting/receiving mode, among other examples. In instances where a computing system 1101 is transmitting commands to set an NDE device in one of the above-identified modes, commands may be transmitted to a processing unit of an NDE device that is configured to receive such commands via a data transmission component of the NDE device. As such, a computing device 1101 may be configured to implement a data transmission component that works with a same data transmission protocol that an NDE is configured to receive data through.

Referring still to FIG. 11, processing system 1102 may comprise processor, a micro-processor and other circuitry that retrieves and executes software 1105 from storage system 1103. Processing system 1102 may be implemented within a single processing device but may also be distributed across multiple processing devices or sub-systems that cooperate in executing program instructions. Examples of processing system 1102 include general purpose central processing units, microprocessors, graphical processing units, application specific processors, sound cards, speakers and logic devices, as well as any other type of processing devices, combinations, or variations thereof.

Storage system 1103 may comprise any computer readable storage media readable by processing system 1102 and capable of storing software 1105. Storage system 1103 may include volatile and nonvolatile, removable and non-removable media implemented in any method or technology for storage of information, such as computer readable instructions, data structures, program modules, cache memory or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 1103 may also include computer readable communication media over which at least some of software 1105 may be communicated internally or externally. Storage system 1103 may be implemented as a single storage device but may also be implemented across multiple storage devices or sub-systems co-located or distributed relative to each other. Storage system 1103 may comprise additional elements, such as a controller, capable of communicating with processing system 1102 or possibly other systems. In some examples, storage system 1103 is a distributed network storage/web storage, where computing device 1101 is configured to connect to the distributed network storage/web storage via a network connection.

Software 1105 may be implemented in program instructions and among other functions may, when executed by processing system 1102, direct processing system 1102 to operate as described with respect to the various operational scenarios, sequences, and processes illustrated herein. For example, software 1105 may include program instructions for an NDE application/service for wooden specimen testing 1106, as described in the foregoing description.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1105 may include additional processes, programs, or components, such as operating system software, virtual machine software, or other application software. Software 1105 may also comprise firmware or some other form of machine-readable processing instructions executable by processing system 1102.

In general, software 1105 may, when loaded into processing system 1102 and executed, transform a suitable apparatus, system, or device (of which computing system 1101 is representative) overall from a general-purpose computing system into a special-purpose computing system customized to process data and respond to queries. Indeed, encoding software 1105 on storage system 1103 may transform the physical structure of storage system 1103. The specific transformation of the physical structure may depend on various factors in different implementations of this description. Examples of such factors may include, but are not limited to, the technology used to implement the storage media of storage system 1103 and whether the computer-storage media are characterized as primary or secondary storage, as well as other factors.

For example, if the computer readable storage media are implemented as semiconductor-based memory, software 1105 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1107 may include communication connections and devices that allow for communication with other computing systems (not shown) over communication networks (not shown). Communication interface system 1107 may also be utilized to cover interfacing between processing components described herein. Examples of connections and devices that together allow for inter-system communication may include network interface cards or devices, wired and/or wireless modules, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 1109 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 1109. In some cases, the input and output devices may be combined in a single device, such as a display capable of displaying images and receiving touch gestures. The aforementioned user input and output devices are well known in the art and need not be discussed at length here.

User interface system 1109 may also include associated user interface software executable by processing system 1102 in support of the various user input and output devices discussed above. Separately or in conjunction with each other and other hardware and software elements, the user interface software and user interface devices may support a graphical user interface, a natural user interface, or any other type of user interface, for example, that enables front-end processing of exemplary application/services described herein (including an NDE application/service for wooden specimen testing 1106). User interface system 1109 comprises a graphical user interface that is configured to enable users to transmit/receive commands for a state of an NDE device and to toggle a state of an NDE device (e.g., change a mode of an NDE device for specific task related to utility pole testing). A graphical user interface of user interface system 1109 may further be configured to display graphical user interface elements (e.g., data fields, menus, graphs, charts, data correlation representations and identifiers, control elements, etc.) that are representations generated from processing ultrasonic signal data received from one or more NDE devices. For example, processing of received ultrasonic signal data, received from one or more NDE devices, may be utilized to provide explicit statistical data regarding a condition of a wooden specimen as well as classifications of a state of a wooden specimen that reflect algorithmic analysis of received ultrasonic signal data (e.g., that the wooden specimen is: tagged for replacement, flagged for re-testing at specified future time period; in good condition). Such example interpretations are non-limiting examples of the type of evaluation that can be made from received ultrasonic signal data and which may be provided as graphical user interface elements in a graphical user interface of an NDE application/service for wooden specimen testing 1106. As referenced in the foregoing description, an exemplary graphical user interface may further be configured to enable users to send control commands to control NDE of a wooden specimen. For example, commands may be transmitted to vary scientific parameters (e.g., voltage, resonance frequency) associated with NDE of a wooden specimen.

Communication between computing system 1101 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), Bluetooth, infrared, RF, cellular networks, satellite networks, global positioning systems, as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

Moreover, the present disclosure extends to methods of manufacture of an exemplary NDE device as described herein. The NDE device may be designed and fabricated to allow ultrasonic waves to be transmitted and/or received through via the NDE device during NDE of a wooden specimen such as a wooden utility pole. The NDE device is designed and fabricated to for in-the-field testing to withstand a variety of environmental conditions while being optimally tuned and stabilized for the transmission and receipt of acoustic signal data.

Components of the NDE device, as described in the foregoing description, may be individually fabricated and then combined in accordance with the foregoing technical description. Alternatively, the NDE device may be manufactured and distributed as an assembled device. Fabricating of the NDE device may comprise machining specific portions of the waveguide as described in the foregoing description. In one non-limiting example, the NDE device may be fabricated out of a material that matches a transducer horn of an ultrasonic transducer, for example, to reduce impedance mismatch during transmission of acoustic signals. Processing for machining mechanical components of an NDE device is known to one skilled in the field of art.

An exemplary case assembly may be fabricated out of any solid and rigid material. Non-limiting examples of such materials comprise but are not limited to: plastics, metals, alloys, polycarbonates, ceramics and glass, among other examples. Fabrication of the case assembly may comprise fabricating a base portion (e.g., shell portion) that substantially (or fully) encapsulates the transducer assembly and electronic assembly. As referenced in the foregoing description, the base portion of the case assembly may be formulated in any shape. In one example, the case assembly is fabricated in a cylindrical shape to streamline attachment of the NDE device to a testing object in a wooden specimen (e.g., creating a hands-free configuration). Components of the case assembly that may be fabricated during a method of manufacturing have been described in the foregoing description and comprise but are not limited to: apertures, slots, fastening mechanisms, spacers; bearing components; tracks; an end cap, and attachment interfaces, among other examples. In further examples, processing for fabricating and connecting components such as the electrical assembly and an ultrasonic transducer are known to one skilled in the field of art.

The method of manufacture may further comprise operations to generate a composite assembly for the NDE device including operations comprising but not limited to: attaching the transducer assembly to the electronic assembly; attaching the transducer assembly and the electronic assembly to the casing assembly (e.g., including securing components via tracks, slots, etc.); attaching a power source (e.g., battery) to the electronic assembly; programming components of the electronic assembly to execute operations described herein for NDE of wooden specimen; updating firmware; quality inspection of fabricated NDE devices including command processing and evaluation of different modes of operation; and securing the NDE device (e.g., attaching an end cap once components are encapsulated in casing assembly), among other examples.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A device for non-destructive evaluation (NDE) of a wooden specimen, comprising:

a transducer assembly that comprises an ultrasonic transducer;
an electronic processing assembly that comprises a processing unit and a printed circuit assembly that is connected with the ultrasonic transducer and the processing unit, wherein the electronic processing assembly is configured to receive, from the ultrasonic transducer, ultrasonic signal data and transmit, to a computing device, the ultrasonic signal data via a data transmission component of the processing unit; and
a case assembly, housing the transducer assembly and the electronic processing assembly, wherein the casing assembly is: configured, at an end portion, to attach to a testing object for NDE of the wooden specimen and is further secured to the transducer assembly with one or more fastening components.

2. The device of claim 1, wherein the casing assembly comprises a coupling interface component that is configured to enable contact of the transducer assembly with the testing object for the NDE of the wooden specimen, wherein the coupling interface component attaches to a transducer horn of the ultrasonic transducer, and wherein the coupling interface component comprises an interface well that is configured to secure the device to the testing object, and an aperture that enables the transducer horn to directly contact the testing object.

3. The device of claim 2, wherein the case assembly is rotatable to adjust contact stress between the testing object and the transducer horn via the coupling interface component.

4. The device of claim 2, wherein the coupling interface component is detachable from the transducer horn.

5. The device of claim 1, wherein the data transmission component is configured to establish a wireless connection between the processing unit and the computing device.

6. The device of claim 5, wherein the data transmission component is configured for one or more selected from a group consisting of: Bluetooth transmission, infrared transmission, radio frequency transmission, Wi-Fi communication, cellular transmission, satellite transmission, and global positioning system transmission.

7. The device of claim 1, wherein the data transmission component is configured to establish a wired connection between the processing unit and the computing device, and wherein the electronic processing assembly comprises a wiring interface to connect a wire between the processing unit and the computing device to establish the wired connection.

8. The device of claim 1, further comprising: one or more spacers positioned between the transducer assembly and the electronic processing assembly to maintain clearance for physical oscillations created during usage of the device.

9. The device of claim 1, wherein the transducer assembly is secured to the electronic processing assembly within the casing assembly.

10. The device of claim 1, wherein the electronic processing assembly is further configured to receive, at the processing unit via the data transmission component, one or more commands to set the device in a transmitting mode, and wherein, in the transmitting mode, the processing unit interfaces with the printed circuit assembly to excite the ultrasonic transducer to transmit, as the ultrasonic signal data, multiple ultrasonic signals.

11. The device of claim 1, wherein the one or more fastening components comprise one or more of: a first clamp and a second clamp.

12. The device of claim 11, wherein the ultrasonic transducer is positioned between the first clamp and the second clamp.

13. The device of claim 1, wherein the case assembly comprises a base portion that houses the transducer assembly and the electronic processing assembly, and a detachable end cap that is attached with the base portion of the case assembly.

14. The device of claim 13, wherein an end portion of the base portion is threaded to enable interfacing with the detachable end cap.

15. The device of claim 14, wherein case assembly is a cylindrical enclosure that comprises an assembly well, spaced from an exterior portion of the case assembly, to house the transducer assembly and the electronic processing assembly and allow unobstructed vibration of the ultrasonic transducer.

16. The device of claim 1, wherein the electronic processing assembly comprises a battery that provides a power source for the electronic processing assembly.

17. The device of claim 16, wherein the electronic processing assembly comprises a carrier that secures the printed circuit assembly and the processing unit within the case assembly, wherein a battery holder is further attached to the carrier, and wherein the battery is attachable to and detachable from the battery holder.

18. The device of claim 1, wherein the electronic processing assembly is further configured to receive, at the processing unit via the data transmission component, one or more commands to set the device in a transmitting mode, and wherein, in the transmitting mode, the processing unit interfaces with the printed circuit assembly to excite the ultrasonic transducer to generate the ultrasonic signal data based on processing of the one or more commands.

19. The device of claim 1, wherein the electronic processing assembly is further configured to receive, at the processing unit via the data transmission component, one or more commands to set the device in a receiving mode that enables the device to receive transmitted ultrasonic signal data from the wooden specimen, and wherein, in the receiving mode, the electronic processing assembly is configured to process the transmitted ultrasonic signal data for output to the computing device when the transmitted ultrasonic signal data is received.

20. The device of claim 1, wherein the transducer assembly further comprises two O-ring bushings and two gasket tracks to guide the two O-ring bushings to permit vibrational motion of the ultrasonic transducer, during operation, in a radial direction.

21. A system for non-destructive evaluation (NDE) of a wooden specimen, comprising:
a first NDE device that comprises:
a transducer assembly that comprises an ultrasonic transducer,
an electronic processing assembly that comprises a processing unit, and a printed circuit assembly that is connected with the ultrasonic transducer and the processing unit, wherein the processing unit is configured to receive, via a data transmission component of the processing unit, one or more commands to set the first NDE device in a transmitting mode, and wherein in the transmitting mode, the processing unit interfaces with the printed circuit assembly to excite the ultrasonic transducer to generate ultrasonic signal data based on processing of the one or more commands, and a case assembly, housing the transducer assembly and the electronic processing assembly, that comprises, at an end portion, a coupling interface component configured to enable contact of the transducer assembly with a testing object for NDE testing of the wooden specimen, and wherein the casing assembly is further secured to the transducer assembly by one or more fastening components; and a second NDE device that comprises:
- a transducer assembly that comprises an ultrasonic transducer,
- an electronic processing assembly that comprises a processing unit, and a printed circuit assembly that is connected with the ultrasonic transducer and the processing unit, wherein the processing unit is configured to receive, via a data transmission component of the processing unit, one or more commands to set the second NDE device in a receiving mode that enables the second NDE device to receive transmitted ultrasonic signal data from the wooden specimen, and wherein, in the receiving mode, the electronic processing assembly is configured to process the transmitted ultrasonic signal data for output to the computing device when the transmitted ultrasonic signal data is received, and
- a case assembly, housing the transducer assembly and the electronic processing assembly, that comprises, at an end portion, a coupling interface component configured to enable contact of the transducer assembly with a testing object for the NDE testing of the wooden specimen and wherein the casing assembly is further secured to the transducer assembly by one or more fastening components.

22. The system of claim 21, wherein the electronic processing assembly, of each of the first NDE device and the second NDE device, comprises a battery that provides a power source for a respective electronic processing assembly of the first NDE device or the second NDE device.

23. The system of claim 21, wherein the data transmission component, of each of the first NDE device and the second NDE device, is configured to establish one or more of: a wireless connection between the processing unit and the computing device and a wired connection between the processing unit and the computing device.

24. The system of claim 21, wherein the coupling interface component, of each of the first NDE device and the second NDE device, attaches to a transducer horn of the ultrasonic transducer of one of the first NDE device and the second NDE device, and wherein the coupling interface component, of each of the first NDE device and the second NDE device, comprises: an interface well that is configured to secure one of the first NDE device and the second NDE device to the testing object, and an aperture that enables the transducer horn, of one of first NDE device and the second NDE device, to directly contact the testing object.

25. The system of claim 21, wherein the coupling interface component, of each of the first NDE device and the second NDE device, is detachable from a respective case assembly of each of the first NDE device and the second NDE device.

26. The system of claim 21, wherein the first NDE device and the second NDE device are attached to the wooden specimen proximate to a groundline plane of the wooden specimen.

27. The system of claim 21, wherein the first NDE device is attached to the wooden specimen proximate to a groundline plane of the wooden specimen, and wherein the second NDE device is attached to the wooden specimen at a portion of the wooden specimen that is above a location of the first NDE device.

28. The system of claim 21, wherein the system further comprises the computing device that is connected with the first NDE device and the second NDE device, and wherein the computing device is executing an application or service that is configured to display processing results of ultrasonic signal data obtained from the first NDE device and the second NDE device.

29. A system for non-destructive evaluation (NDE) of a wooden specimen, comprising:
a computing device executing an NDE application or service that is configured to control operation of one or more NDE devices; and
the one or more NDE devices that comprise:
- a transducer assembly that comprises an ultrasonic transducer,
- an electronic processing assembly that comprises a processing unit, and a printed circuit assembly that is connected with the ultrasonic transducer and the processing unit, wherein the processing unit is configured to interface with the computing device, via a data transmission component of the processing unit, to either transmit ultrasonic signal data or receive the ultrasonic signal data based on command instruction provided through the NDE application or service, and
- a case assembly, housing the transducer assembly and the electronic processing assembly, that comprises, at an end portion, a coupling interface component configured to enable contact of the transducer assembly with a testing object for NDE testing of the wooden specimen, and wherein the casing assembly is further secured to the transducer assembly by one or more fastening components.

30. The system of claim 29, wherein the electronic processing assembly, of the one or more NDE devices comprises a battery that provides a power source for the electronic processing assembly.

31. The system of claim 29, wherein the coupling interface component, of the one or more NDE devices, attaches to a transducer horn of the ultrasonic transducer, and wherein the coupling interface component comprises: an interface well that is configured to secure the one or more NDE devices to the testing object, and an aperture that enables the transducer horn to directly contact the testing object.

32. The system of claim 29, wherein the data transmission component, of the one or more NDE devices is configured to establish one or more of: a wireless connection between the processing unit and the computing device and a wired connection between the processing unit and the computing device.

* * * * *